US010645418B2

(12) United States Patent
Alakuijala et al.

(10) Patent No.: US 10,645,418 B2
(45) Date of Patent: May 5, 2020

(54) MORPHOLOGICAL ANTI-RINGING FILTER FOR LOSSY IMAGE COMPRESSION

(71) Applicant: GOOGLE LLC, Mountain View, CA (US)

(72) Inventors: Jyrki Alakuijala, Wollerau (CH); Zoltan Szabadka, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 159 days.

(21) Appl. No.: 15/952,287

(22) Filed: Apr. 13, 2018

(65) Prior Publication Data

US 2019/0320206 A1 Oct. 17, 2019

(51) Int. Cl.
| | | |
|---|---|---|
| *H04N 19/44* | (2014.01) | |
| *H04N 19/625* | (2014.01) | |
| *H04N 19/91* | (2014.01) | |
| *H04N 19/176* | (2014.01) | |
| *H04N 19/124* | (2014.01) | |

(52) U.S. Cl.
CPC ......... *H04N 19/625* (2014.11); *H04N 19/124* (2014.11); *H04N 19/176* (2014.11); *H04N 19/44* (2014.11); *H04N 19/91* (2014.11)

(58) Field of Classification Search
CPC .... H04N 19/625; H04N 19/91; H04N 19/176; H04N 19/44; H04N 19/124; H04N 19/86; H04N 19/46
USPC .................................................. 375/240.03
See application file for complete search history.

(56) References Cited

U.S. PATENT DOCUMENTS

| | | | |
|---|---|---|---|
| 5,731,836 A | 3/1998 | Lee | |
| 6,574,374 B1* | 6/2003 | Acharya | G06T 5/30 375/E7.04 |
| 7,003,170 B1* | 2/2006 | Martucci | H04N 19/60 375/E7.187 |
| 7,151,863 B1 | 12/2006 | Bradley et al. | |
| 7,995,649 B2 | 8/2011 | Zuo et al. | |

(Continued)

OTHER PUBLICATIONS

MPEG-4 specification (ISO/IEC 14496-2. MPEG Meeting; 1998; Tokyo; Motion Picture Expert Group or ISO/IEC JTC1/SC29/WG11), (Year: 1998).*

(Continued)

*Primary Examiner* — Ayman A Abaza
(74) *Attorney, Agent, or Firm* — Young Basile Hanlon & MacFarlane, P.C.

(57) ABSTRACT

Morphological anti-ringing is disclosed. A method for encoding a block of an image includes generating a transform block for the block of first values, generating quantized transform coefficients for the transform block, determining a clamping value for the block, encoding the quantized transform coefficients in a compressed bitstream, and encoding the clamping value in the compressed bitstream. The clamping value is used to clamp second values. The second values correspond to the first values and result from inverse transforming the transform block. An apparatus for decoding a block of an image includes a memory and a processor configured to execute instructions stored in the memory to decode, from a compressed bitstream, a quantized transform block; obtain, using the quantized transform block, a decoded block of pixel values; decode, from a compressed bitstream, a clamping value for the block; and clamp the pixel values using the clamping value.

16 Claims, 10 Drawing Sheets

(56) References Cited

U.S. PATENT DOCUMENTS

| | | | |
|---|---|---|---|
| 9,633,609 | B2 | 4/2017 | Kao et al. |
| 2004/0228415 | A1* | 11/2004 | Wang ............... H04N 19/42 375/240.29 |
| 2005/0168644 | A1 | 8/2005 | Demas et al. |
| 2006/0171467 | A1 | 8/2006 | Schoner |
| 2007/0140554 | A1* | 6/2007 | Strom ............... H04N 19/105 382/166 |
| 2007/0280551 | A1* | 12/2007 | Oztan ............... H04N 19/86 382/268 |
| 2010/0060717 | A1 | 3/2010 | Klein Gunnewiek et al. |
| 2017/0064313 | A1* | 3/2017 | Wu ................... H04N 19/33 |

OTHER PUBLICATIONS

Motion Picture Group; "Coding of Audio-Visual Objects: Visual"; International Organisation for standardisation Organisation Internationale De Normalisation ISO/IEC JTC1/SC29/WG11 Coding of Moving Pictures and Audio; Mar. 1998.

Pavel Krajcevski et al; "Real-Time Low-Frequency Signal Modulated Texture Compression using Intensity Dilation"; Mar. 2014; pp. 127-134.

Bankoski, et al., "Technical Overview of VP8, An Open Source Video Codec for the Web", Jul. 11, 2011, 6 pp.

Bankoski et al, "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion dated Sep. 9, 2019 of International Patent Application No. PCT/US2019/026979; 19 pages.

* cited by examiner

US 10,645,418 B2

MORPHOLOGICAL ANTI-RINGING FILTER FOR LOSSY IMAGE COMPRESSION

BACKGROUND

Image content (e.g., still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artifacts, such as ringing artifacts, into the decompressed image. Higher compression levels can result in more observable ringing artifacts. It is desirable to minimize the ringing artifacts while maintaining high levels of compression.

SUMMARY

One aspect of this disclosure is a method for encoding a block of an image, wherein the block includes first values. The method includes generating a transform block for the block of first values, generating quantized transform coefficients for the transform block, determining a clamping value for the block, encoding the quantized transform coefficients in a compressed bitstream, and encoding the clamping value in the compressed bitstream. The clamping value is used to clamp second values. The second values correspond to the first values and result from inverse transforming the transform block.

Another aspect is an apparatus for encoding blocks of an image, wherein the block includes first values. The apparatus includes a memory and a processor that is configured to execute instructions stored in the memory to generate a transform block for the block of first values, generate quantized transform coefficients for the transform block, determine a clamping value for the block, encode the clamping value in a compressed bitstream, and encode the quantized transform coefficients in the compressed bitstream. The clamping value is used to clamp second values. The second values correspond to the first values and result from inverse transforming the transform block.

Another aspect is an apparatus for decoding a block of an image, wherein the apparatus includes a memory and a processor configured to execute instructions stored in the memory to decode, from a compressed bitstream, a quantized transform block; obtain, using the quantized transform block, a decoded block of pixel values; decode, from a compressed bitstream, a clamping value for the block; and clamp the pixel values using the clamping value.

These and other aspects of the present disclosure are disclosed in the following detailed description of the embodiments, the appended claims, and the accompanying figures.

DETAILED DESCRIPTION

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to quantizing of frequency domain information (as further described below).

Lossy compression aims to describe (i.e., code, compress, etc.) an image with the least number of bits while preserving, as much as possible, the quality of the image when the compressed image is decompressed. That is, lossy compression techniques seek to compress an image without degrading the quality of the image beyond an unacceptable level that would be perceivable, for example, by the human eye.

Fewer bits can be used to describe slow-changing areas and/or objects of the image than can be used to describe fast-changing areas and/or objects. "Slow-changing" and "fast-changing" in this context refer to changes in the frequency domain. In an example, an image, such as an image 910 of FIG. 9, includes a sky that forms the background of the image 910 and branches that occlude at least part of the background. The areas covered by the sky background, such as an area 902, are slow-changing areas. That is, the slow-changing areas correspond to spatially low frequency areas. The areas of the image 910 that include the transitions between the background sky and the branches, such as an area 904, are fast-changing areas. That is, the fast-changing areas correspond to spatially high frequency areas. An area 906 (i.e., a portion of the tree trunk) illustrates another example of slow-changing areas. As such, the image 910 illustrates that the background sky includes mostly slow-changing areas but also includes fast-changing areas.

As further described below, encoding an image or an image of a video (i.e., a frame of a video) can include partitioning the image into blocks. As used herein, both "image" and "picture" refer to a single image or to a frame of a video. A block can include slow-changing areas (i.e., low frequency signals) and fast-changing areas (i.e., high frequency signals). Techniques for modeling (e.g., encoding) fast-changing areas may not capture (e.g., properly and/or optimally encode) slow-changing areas.

Figure 9:
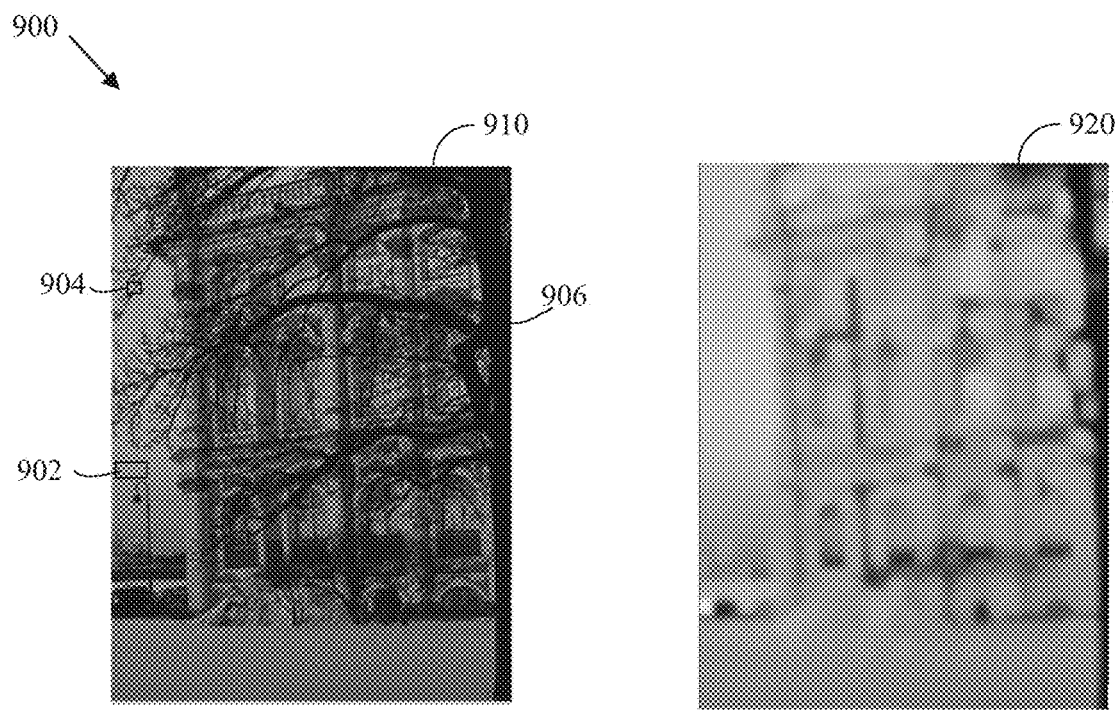
FIG. 9 illustrates an example of modeling maximum brightness in localities of an image according to implementations of this disclosure.

Lossy compression techniques can produce undesirable artifacts, such as ringing artifacts, which appear at sharp transitions in an image (e.g., at the edges between the sky and the branches in the area 904 of FIG. 9). Ringing artifacts can result from compressing high frequency signals. Ringing artifacts may appear as bands and/or ghosts near edges of objects in a decompressed image. Area 912 of FIG. 9 illustrates an example of ringing. The ringing artifacts are due to undershoots and overshoots around edges. "Undershoot" means that a value of a pixel in the decompressed image is less than the value of the same pixel in the source image. That is, undershoot can mean that pixels around the edges are de-emphasized. "Overshoot" means that a value of a pixel in the decompressed image is greater than the value of the same pixel in the source image. That is, overshoot can mean that some pixels around the edges are accentuated. That is, some parts of a bright (dark) background can become even brighter (darker) in the decompressed image, as a result of the lossy compression.

Overshoots and undershoots can result from frequency-domain sinc-type oscillations. For example, in an image that includes a bright (dark) background that is partially occluded by a dark (bright) foreground object, a step-like function exists at the edge of the background and the foreground object. If the edge is compressed based on a frequency-based transform, increased levels of quantization result in the sinc-type oscillations at the proximity of the edge due to the frequency-limiting properties of quantization. As mentioned, undershoots and overshoots can be observed around the edge. Examples of the frequency-based transform (also referred to as "block-based transforms") include, as further described below, a Discrete Cosine Transform (DCT), a Fourier transform (FT), a Discrete Sine Transform (DST), or the like.

Some techniques have been used to reduce ringing in a decoded (i.e., decompressed) image. Such techniques include blurring, Gaussian filters, and/or other loop-filtering techniques. Such techniques can be computationally expensive and/or have undesirable blurring effects.

Implementations according to this disclosure can reduce ringing artifacts by clamping overshoots and/or undershoots. The clamping value can be derived using one or more morphological operations. A morphological operation relates to the relative ordering of pixel values in an image. "Pixel value" means the value of a color component of the color model used for the image. For example, the color model can be based on a luminance component (Y) and two chrominance components (U and V or Cb and Cr), which may be referred to as the YUV or YCbCr color model, or color space. Other color models can be used.

A first example of a morphological operation is an operation that can be used to determine a maximum pixel value for a locality. For example, the morphological operation can simply be an operation that takes the maximum value of all the pixels in the locality. That is, if the locality is a block of size M×N, where p(x, y) represents a pixel value at Cartesian location (x, y) of the block, then the maximum value can be given by max(p(x, y) for all $0 \le x \le M-1$, $0 \le y \le N-1$). In another example, the morphological operation for determining the maximum value for a locality can be a dilation operation, as further described below.

A second example of a morphological operation is an operation that can be used to determine a minimum pixel value for a locality. For example, the morphological operation can simply be an operation that takes the minimum value of all the pixels in the locality. That is, if the locality is a block of size M×N, where p(x, y) represents a pixel value at Cartesian location (x, y) of the block, then the minimum value can be given by min(p(x, y) f or all $0 \le x \le M-1$, $0 \le y \le N-1$). In another example, the morphological operation for determining the minimum value for a locality can be an erosion operation, as further described below.

Information related to the local maxima and/or local minima can be communicated by the encoder to a decoder. When an undershoot in a locality falls below a local known minimum for the locality, the undershoot can be clamped based on the local known minimum. Local maxima and/or local minima can be determined by an encoder. When an overshoot in a locality (e.g., a block of an image) exceeds a local known maximum for the locality, the overshoot can be clamped based on the local known maximum. The decoder can use the information to clamp overshoots and undershoots. In an example, the related information can be the local maximum value itself. For example, if the encoder determines that the maximum (minimum) luminance value for a block is 167 (35), after the block is decoded, the decoder sets the luminance value of any pixel of the decoded block whose luminance value exceeds 167 (is less than 35) to 167 (35).

In an example of using dilation, a slow-changing background of an image can be modeled using a low-information content model. For example, the low-information content model can be a blurry image at a low resolution. As such, the low-information content model is such that a small number of bits are required to communicate the model to a decoder. For example, the low-information content model can be one, or less, pixel values for each M×N block of an image. The image can then be compressed (e.g., encoded).

When the compressed image is decompressed (e.g., decoded), if a pixel value in a block is darker than the low-information content model for the block, the pixel can be set to the low-information content model for the block. As such, the effect of the previous operation can be summarized as: If an object is darker, the object is set to the minimum of values of the decompressed image and the blurry image, thereby eliminating (or reducing) ringing overshoots. Similarly, if an object is lighter, the object is set to the maximum of values in the decompressed image and the blurry image, thereby eliminating (or reducing) ringing undershoots.

Using the techniques described herein, ringing artifacts can be reduced by fifty percent (50%) for some images. Any remaining ringing artifacts may not be perceivable by the human eye. The histogram of the image, at least in the proximity of edges, can be substantially preserved. That is, the distribution of pixel values in the source image can be relatively intact in the decompressed image, which results in a more natural image (i.e., the decompressed image substantially matching the source image). That is, for example, and with reference to the image 910 of FIG. 9, the dark branches of the tree do not cause a brighter sky around the edges: the local histogram of the source image (i.e., before compression) in the proximity of the branches is preserved.

Implementations according to this disclosure can be applied to images, whereby at least one or more of the following conditions applies: a transform (e.g., a DCT, a DST, etc.) is used in encoding the image, the image includes a smooth background (e.g., a sky) that can make ringing artifacts noticeable, a high contrast and high-information content object occludes the background, and/or the high-information content object is either darker or lighter than the background.

Details of morphological anti-ringing filters for lossy image compression are described herein with initial reference to a system in which the teachings herein can be implemented.

Figure 1:
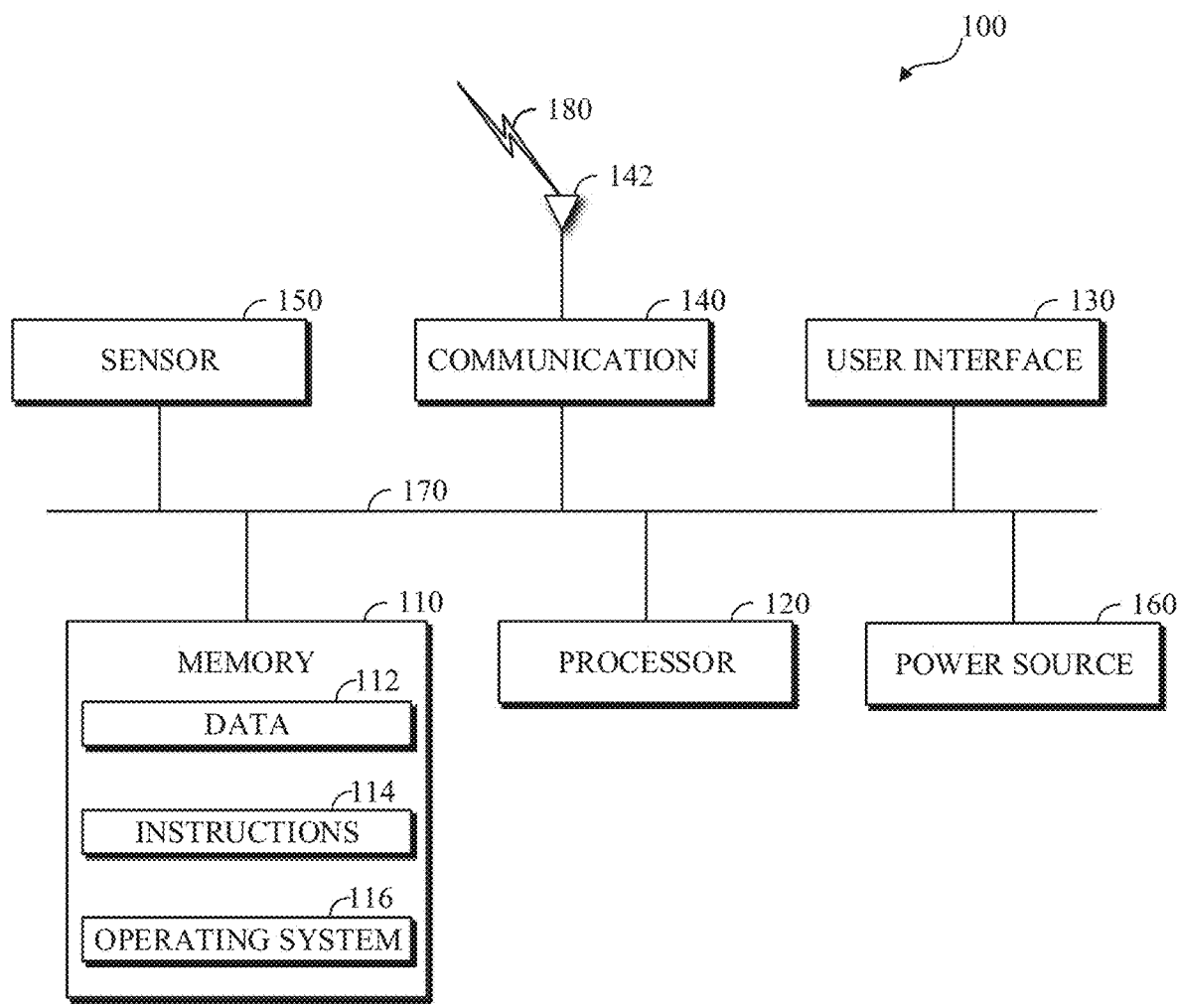
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated in any number of separate physical units. For example, the user interface 130 and processor 120 can be integrated in a first physical unit, and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuit (ASIC), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special-purpose processor, or circuitry, that can include specialized hardware for carrying out any of the methods, algorithms, aspects, or combinations thereof, as described herein. Portions of the instructions 114 can be distributed across multiple processors on the same machine or different machines or across a network, such as a local area network, a wide area network, the Internet, or a combination thereof.

The processor 120 can include any device or system, now-existing or hereafter developed, capable of manipulating or processing a digital signal or other electronic information, including optical processors, quantum processors, molecular processors, or a combination thereof. For example, the processor 120 can include a special-purpose processor, a central processing unit (CPU), a digital signal processor (DSP), a plurality of microprocessors, one or more microprocessors in association with a DSP core, a controller, a microcontroller, an Application Specific Integrated Circuit (ASIC), a Field Programmable Gate Array (FPGA), a programmable logic array, a programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber-optic communication medium, a wire-line communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motionsensing device, or a combination thereof. For example, the sensor 150 may include a sound-sensing device, such as a microphone, or any other sound-sensing device, now existing or hereafter developed, that can sense sounds in the proximity of the computing device 100, such as speech or other utterances, made by a user operating the computing device 100. In another example, the sensor 150 may include a camera, or any other image-sensing device, now existing or hereafter developed, that can sense an image, such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160 may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof, can be integrated in one or more electronic units, circuits, or chips.

Figure 2:
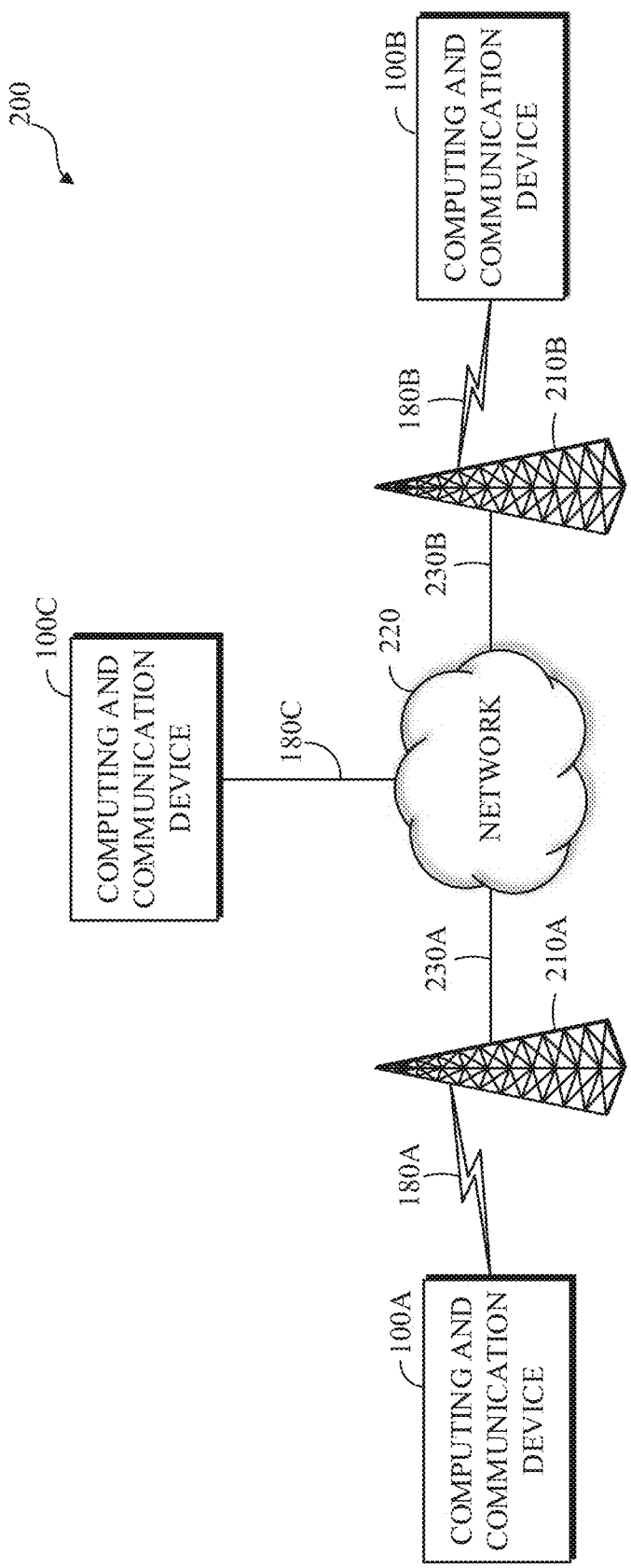
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communications system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, or 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof, audio data; and one or both of the computing and communication device 100A and the computing and communication device 100B may receive, decode, process, store, present, or a combination thereof, the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication devices 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the Transmission Control Protocol (TCP), the User Datagram Protocol (UDP), the Internet Protocol (IP), the Real-time Transport Protocol (RTP), the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown, the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
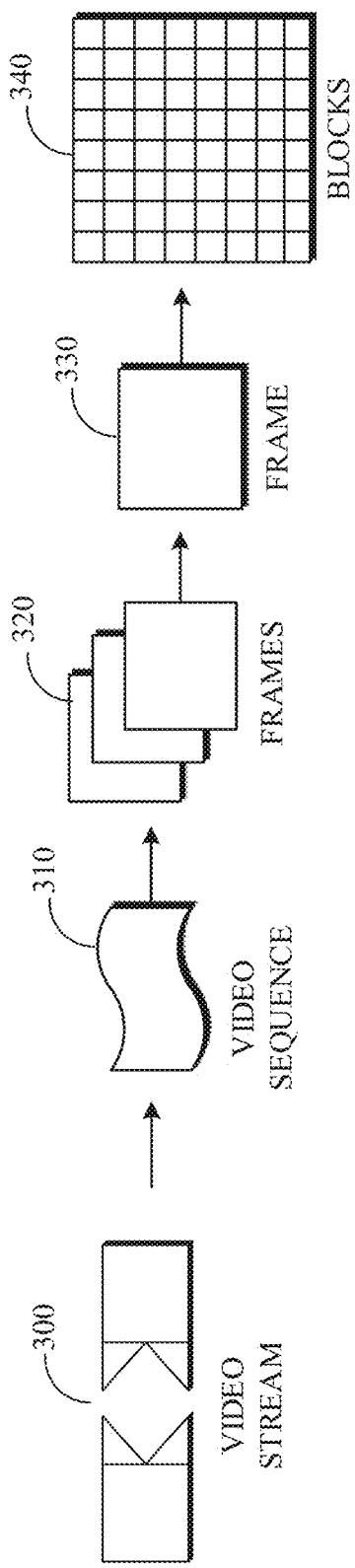
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term "block" can include a superblock, a macroblock, a segment, a slice, or any other portion of a frame. A frame, a block, a pixel, or a combination thereof, can include display information, such as luminance information, chrominance information, or any other information that can be used to store, modify, communicate, or display the video stream or a portion thereof.

In some implementations, a frame that is not part of a video stream is encoded and decoded in accordance with implementations of this disclosure.

Figure 4:
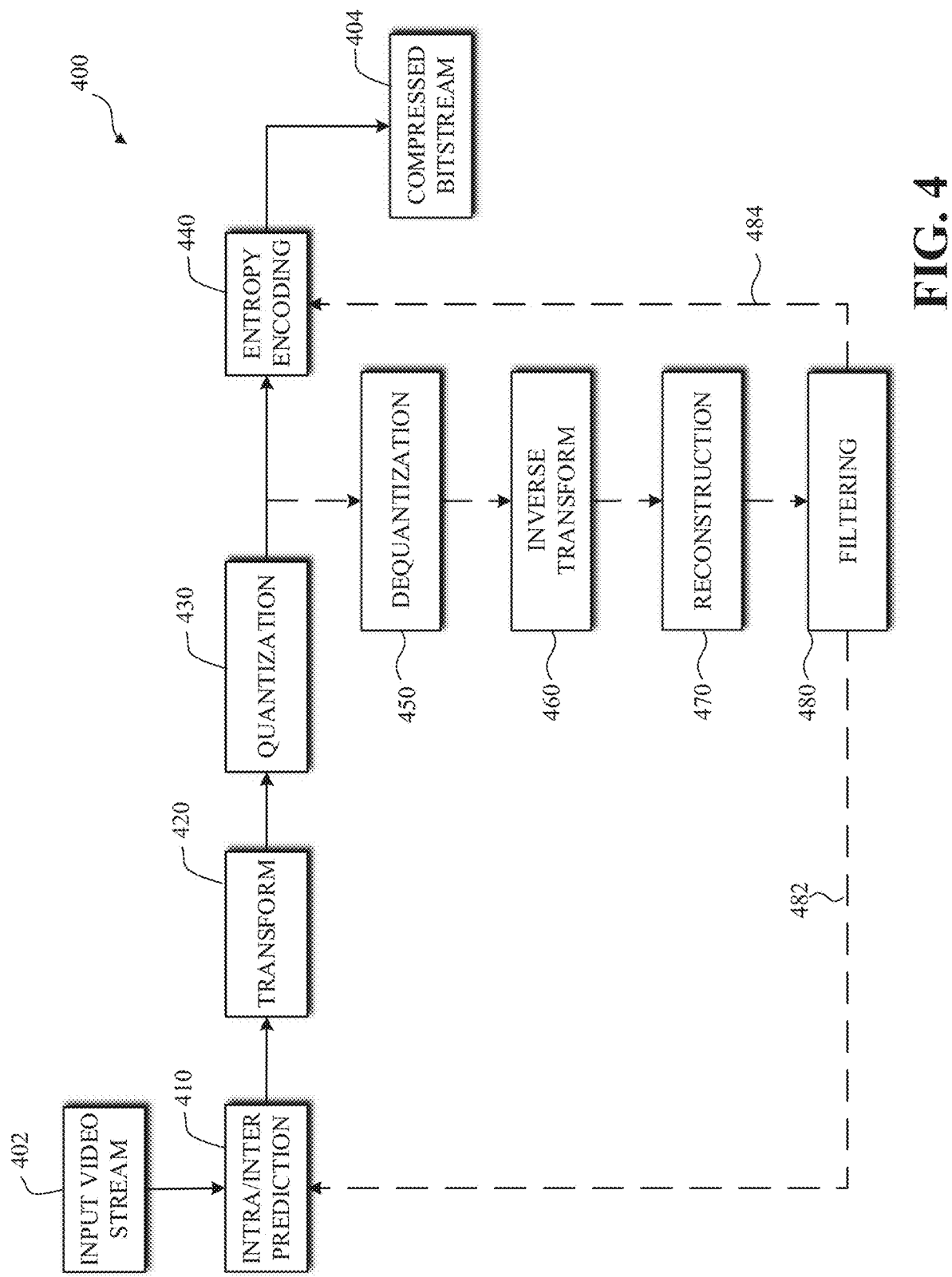
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to encode video data as described herein. The encoder 400 can be implemented as specialized hardware included, for example, in the computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The input video stream 402 can be a single image or a collection of images. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), the Fourier transform (FT), the Discrete Sine Transform (DST), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
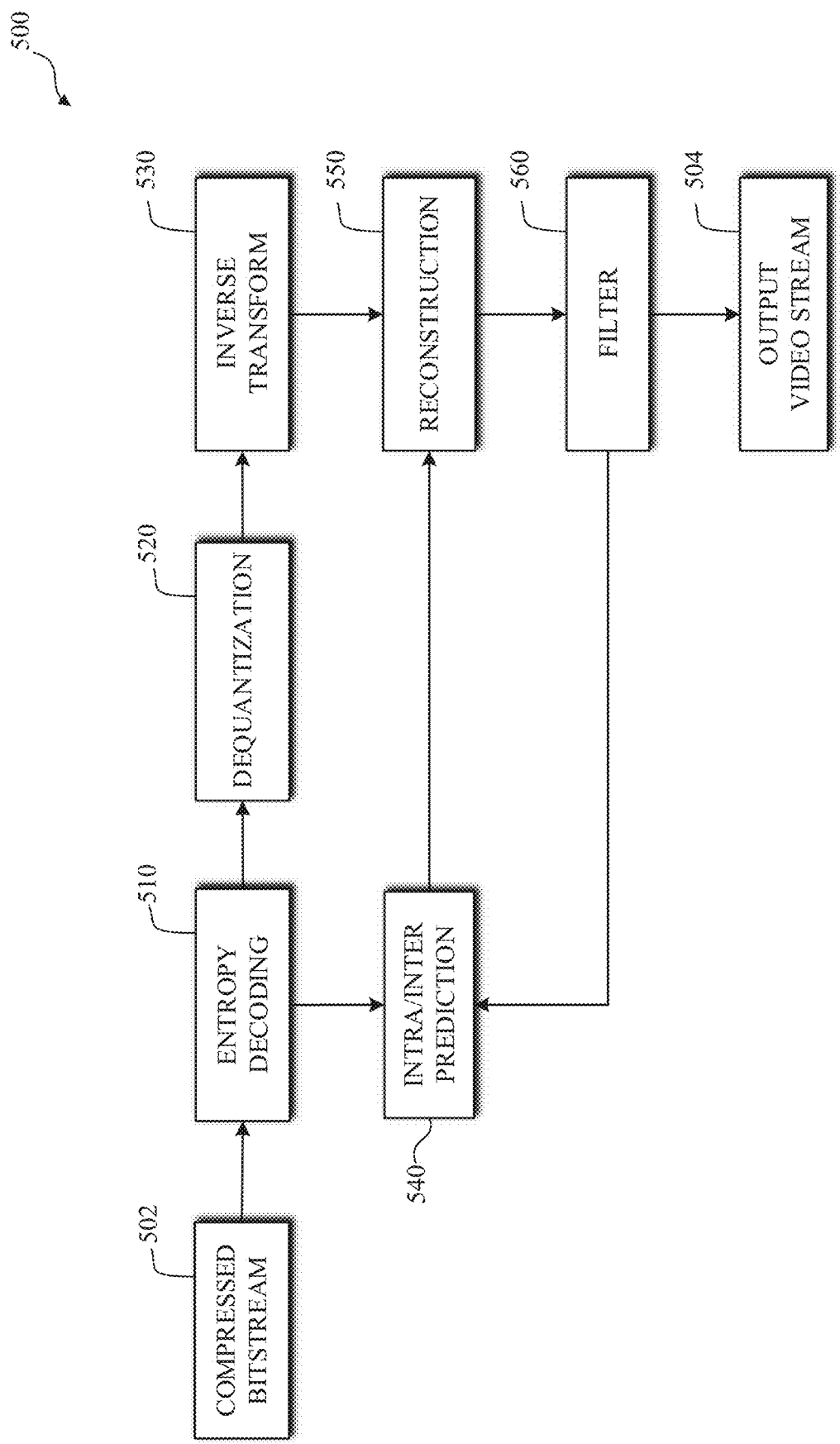
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to decode video data as described herein. The decoder 500 can be implemented as specialized hardware included, for example, in the computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
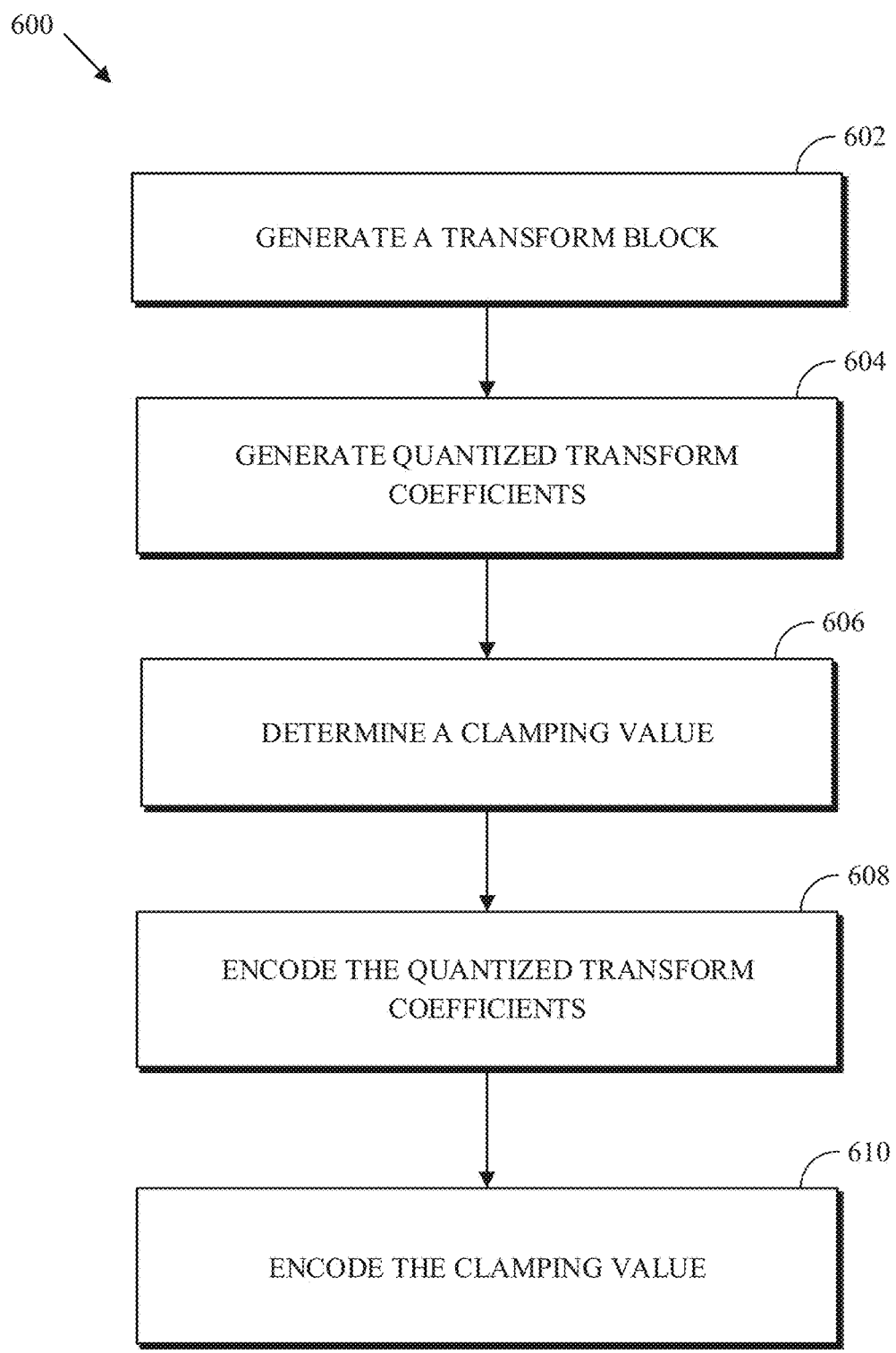
FIG. 6 is an example of a process for encoding a block of an image according to an implementation of this disclosure.

FIG. 6 is an example of a process 600 for encoding a block of an image according to an implementation of this disclosure. The image can be a single image or a frame of a video sequence, such as the frame 330 of FIG. 3. The block can be one of the blocks 340. The block includes first values. That is, the block includes pixels, and each pixel has a corresponding pixel value. The pixel value can be a luminance Y value, a chrominance U value, a chrominance V value, or other color component value. The process 600 transforms the block into one or more transform blocks, quantizes the one or more transform blocks, and then determines a respective clamping value corresponding to at least some of the transform blocks. The clamping values are encoded in a compressed bitstream.

The clamping value can be a maximum value. In such a case, the clamping value is used to upper-bound inverse-transformed coefficient values to the maximum value. The clamping value can be a minimum value. In such a case, the clamping value is used to lower-bound inverse-transformed coefficient values to the minimum value. The clamping value can include both a maximum value and a minimum value, which are used as previously mentioned.

The process 600 can be implemented, for example, as a software program that may be executed by computing devices, such as the computing and communication devices 100A, 100B, 100C. The software program can include machine-readable instructions that may be stored in a memory, such as the memory 110, and that, when executed by a processor, such as the CPU 120, can cause the computing device to perform the process 600. Operations of the process 600 can be implemented in whole or in part in the entropy encoding unit 440, the dequantization unit 450, the inverse transform unit 460, the reconstruction unit 470, the filtering unit 480, other units, or any combination thereof, of the encoder 400. The process 600 can be implemented using specialized hardware or firmware. Multiple processors, memories, or both, may be used.

Figure 7:
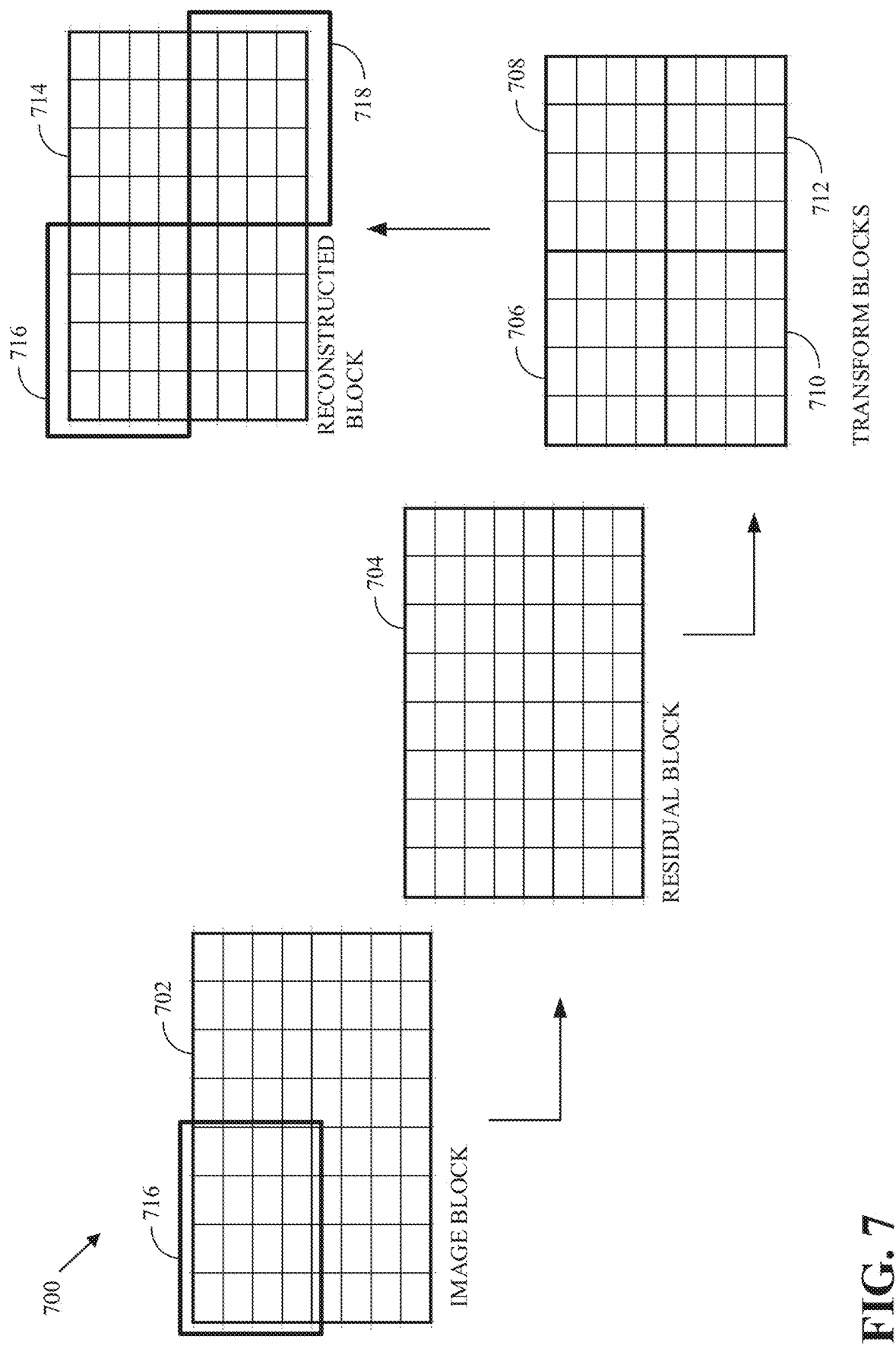
FIG. 7 illustrates an example of encoding an image block according to implementations of this disclosure.

To simplify the explanation of the process 600, a high-level process of encoding an image block is described with reference to FIG. 7. FIG. 7 illustrates an example 700 of encoding an image block according to implementations of this disclosure. A person skilled in the art will appreciate that the example 700 is a simplified example of generating a transform block and that many operations are omitted. In the example 700, an image block 702 is the current block of the image being encoded. The image block 702 is an 8×8 block. However, the disclosure herein is not limited to any block size. For example, the image block can be a 4×4, 8×8, 16×16, 32×32, or any other rectangular- or square-sized block.

As described with respect to FIG. 4, a residual block 704 having the same size as the image block 702 is generated. The residual block 704 is then transformed to the frequency domain. One or more transform blocks can result for the residual block and, equivalently, for the source block. In the example 700, four transform blocks 706-712 are shown. However, more or fewer transform blocks can result for the image block 702. As such, to generate a transform block can mean to generate one or more transform blocks for the image block.

The transform blocks 706-712 are then inverse-transformed, as described with respect to the inverse transform unit 460; and a reconstructed block 714 is generated, as described with respect to the reconstruction unit 470 of FIG. 4.

Returning to FIG. 6, at 602, the process 600 generates a transform block for the block of first values. For example, the process 600 generates the transform block as described with respect to the transform unit 420 of FIG. 4.

At 604, the process 600 generates quantized transform coefficients for the transform block. The process 600 generates the quantized coefficients as described with respect to the quantization unit 430 of FIG. 4.

At 606, the process 600 determines a clamping value for the block. As used in this disclosure, "determine" means to create, form, produce, select, construct, identify, specify, generate, or otherwise determine in any manner whatsoever. The clamping value is used to clamp second values. The second values correspond to the first values and result from inverse transforming the transform block. That is, for example, the clamping value can be used to clamp pixel values of the reconstructed block 714 of FIG. 7. As such, the clamping value can be used to clamp reconstructed pixel values. In an example, the clamping value can be determined by a filtering component, such as the filtering unit 480 of FIG. 4. In an example, the first values and the second values are luminance pixel values. In another example, the first values and the second values are chrominance pixel values.

As described above, the clamping value is used to reduce ringing artifacts. As ringing can be due to quantization, ringing artifacts can be local to a locality of the reconstructed image block that is coextensive with the transform block. For example, and referring to FIG. 7, the locality 716 of the reconstructed block 714 may exhibit ringing (because, for example, it includes an edge between a bright object and a dark object), while the locality 718 may not exhibit ringing. In this context, "locality" can mean sub-block or can mean any subset of the pixels of the reconstructed block. The locality 716 is coextensive with the transform block 706, and the locality 718 is coextensive with the transform block 712.

Determining a clamping value for the block can mean determining zero or more clamping values. Each of the determined clamping values corresponds to a transform block. For example, if no sub-block of the reconstructed block 714 exhibits ringing artifacts (i.e., overshoots and/or undershoots), then no clamping values are determined for the block. For example, if only one sub-block (e.g., the locality 718 corresponding to the transform block 712) exhibits ringing, then only one clamping value is determined for the image block 702. As such, if an image block (e.g., the image block 702) is partitioned into T (e.g., 4) number of transform blocks, then up to T clamping values can be determined for the image block. In another example, if the image block is partitioned into Z localities, then up to Z clamping values can be determined for the image block.

In an example, determining 606 the clamping value for the block includes determining a maximum value for the first values using a morphological operation. In an example, a dilation operation is used to determine the maximum value.

In an example, the dilation operation can be applied to the image as a whole, and the maximum in a locality is taken as a clamping value. For example, the image block 702, which is of size 8×8, may be a block of an image that is of size 256×256 (or any other size). The dilation operation can be applied to the image as a whole and the clamping value can be selected as the maximum pixel value in each sub-block (e.g., the locality 716) of the image block.

In another example, the dilation operation can be applied to the image block, and the maximum in a locality of the image block is taken as a clamping value for the locality. In another example, the dilation operation can be applied at the locality level. That is, for example, the dilation operation can be applied at the locality 716 in order to determine the clamping value. As such, the dilation operation can be applied to a locality of the image block that is coextensive with the transform block. In other examples, the dilation operation can be applied to other localities of the image.

In an example, determining 606 the clamping value for the block can also include determining a minimum value of the first values using an erosion operation. As such, the clamping can include a maximum value and a minimum value. As described with respect to the dilation operation, the erosion operation can be applied to the image, the image block, a sub-block coextensive with a transform block, or other localities of the image.

As described above, a maximum clamping value determined using dilation can be used to upper-bound some of the pixel values of a reconstructed block; and a minimum clamping value can be used to lower-bound some of the pixel values of a reconstructed block. As such, the pixel values are clamped to be within a range. The range having the maximum clamping value as an upper limit and the minimum clamping value as the lower limit.

Figure 8:
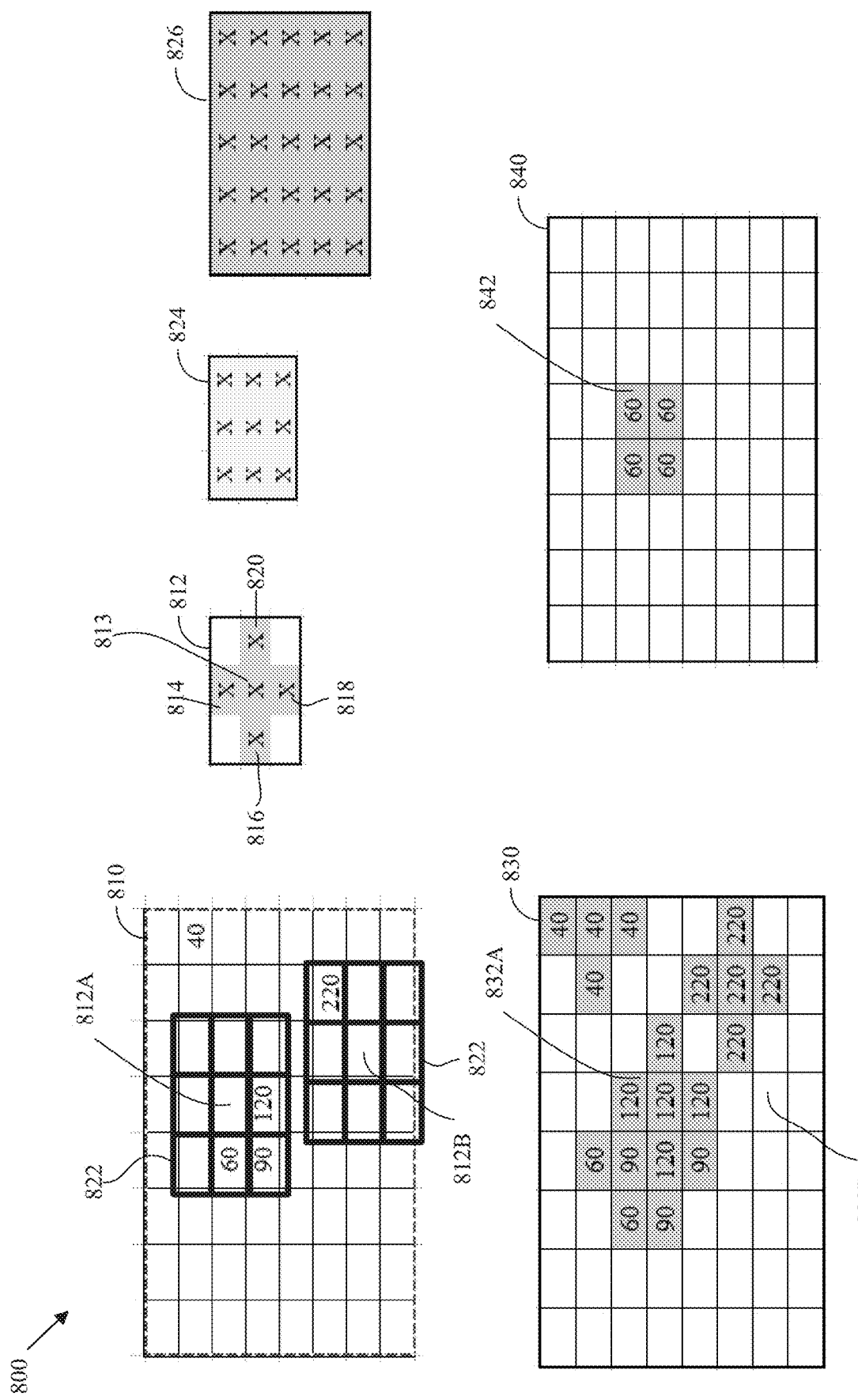
FIG. 8 illustrates an example of the dilation and erosion morphological operations according to implementations of this disclosure.

FIG. 8 illustrates an example 800 of the dilation and erosion morphological operations according to implementations of this disclosure. FIG. 8 includes an image block 810. The image block 810 can be, for example, the image block 702 of FIG. 7. For simplicity of explanation, the example 800 uses only a few pixel values. Empty cells of the image block 810 are ignored for the purpose of the simple example of FIG. 8.

The dilation and erosion morphological operations are forms of image filtering using a structuring element, which is also known as a kernel. FIG. 8 illustrates example structuring elements 812, 824, 826. The structuring element 812 roughly corresponds to a circular structuring element, whereas the structuring elements 824, 826 are square structuring elements. "X" in the structuring elements 812, 824, 826 corresponds to requisite match locations, as further described below. The structuring element 812 includes kernel locations 814-820 and a center 813. In an example, the structuring element 826 can be used to dilate an 8×8 locality.

In the example 800, the dilation operation is applied to the image block 810 to generate the dilated block 830. However, as described above, the dilation operation can be applied to other localities of an image.

In a dilation operation, the center of the structuring element is overlaid on each pixel location of the locality to which the dilation operation is applied. In the dilation operation of the example 800, if there is a "hit" between any of the locations of the kernel and the corresponding area of the image block 810, then the corresponding center location in the dilated image is set to the maximum of the "hits." An outline 822 of the structuring element 812 is shown overlaid on a pixel location 812A and a pixel location 812B of the image block 810. When the center 813 of the structuring element 812 is overlaid on the pixel location 812A, the kernel location 816 "hits" (i.e., overlays) the value 60, and the kernel location 818 "hits" (i.e., overlays) the value 120. None of the center 813 and the kernel locations 818-820 hits any other pixel value in the image block 810. Accordingly, a location 832A of the dilated block 830 is set to the maximum of the hits (i.e., max(60, 120)=120). As another example, when the outline 822 is overlaid (i.e., when the structuring element is centered) on the pixel location 812B, no "hits" result. As such, a location 832B of the dilated block 830 is not set to any value. While the maximum value of the "hits" is described herein, any other combinations (i.e., functions) of the hits can be used. For example, an average (i.e., the function) of the hits can be used.

In the example 800, the erosion operation is applied to the image block 810 to generate the eroded block 840. In a typical erosion operation, the structuring element must completely overlap the image block. That is, there must be a hit with every location of the structuring element: there must be a hit with the center 813 and each of the kernel locations 814-820. While the typical erosion operation can be used, other erosion operations can be used. That is, the erosion operation can be defined in other ways. For example, in the example 800, the erosion operation is defined as: if there are at least two hits, then assign the minimum of the hits to the pixel location in the eroded image; otherwise, assign a zero. As such, overlaying the structuring element 812 (i.e., overlaying the center 813) over the pixel location 812A results in two hits: the kernel location 816 "hits" the value 60, and the kernel location 818 "hits" the value 120. As such, the value 60 (i.e., min(60, 120)=60) is assigned to the corresponding location 842 in the eroded block 840.

Returning to FIG. 6, in some examples, determining the clamping value, at 606, can be performed iteratively. By "iteratively" is meant that more than one clamping value (e.g., more than one maximum clamping value and/or more than one minimum clamping value) are calculated. For example, a first morphological operation can be used to determine a first maximum clamping value, and a second morphological operation is used to determine a second maximum clamping value. The one of the first maximum clamping value and the second maximum clamping value resulting in a smaller error (i.e., the error between a reconstructed block to which clamping value is applied as described herein and the source block) is selected as the determined clamping value. The first morphological operation and the second morphological operation can use different structuring elements, different functions, and/or different techniques for determining the respective clamping values.

At 608, the process 600 encodes the quantized transform coefficients in the compressed bitstream. The process 600 can encode the quantized transform coefficients as described with respect to the entropy encoding unit 440 of FIG. 4. The compressed bitstream can be the compressed bitstream 404 of FIG. 4.

At 610, the process 600 encodes the clamping value in the compressed bitstream. In an example, encoding the clamping value can mean encoding the clamping value itself. In an example, encoding the clamping value can mean encoding an indication of the clamping value or encoding other information indicative of the clamping value. In an example, a post-reconstruction filtering unit, such as the filtering unit 480 of FIG. 4, encodes the clamping value as indicated by the broken line at 484 of FIG. 4. Any technique can be used to encode the clamping value. Additionally, "encoding the clamping value" can mean encoding information indicative of the clamping value such that a decoder (or an encoder reconstruction path) can determine a clamping value, based on the information indicative of the clamping value, in order to clamp values of a decoded block.

In an implementation, the clamping value itself can be encoded in the compressed bitstream. For example, if the clamping value is determined to be the luminance value 167, then the value 167 is encoded in the compressed bitstream.

In another example, a clamping value can be encoded differentially. That is, for example, the difference between the clamping value and the highest value for the locality is encoded. For example, if the clamping value is X, and the maximum value for a locality (e.g., the locality 716 of the image block 702 of FIG. 7) is Y, then the process 600 can encode the value min(0, Y−X). As such, a 0 (e.g., a bit 0) is encoded to indicate that a maximum inverse quantized value is indicative of a true maximum in the source image as opposed to being a new local maxima that is due to quantization. A true maximum is not clamped, whereas a new local maxima is clamped. Similarly, if the clamping value is X, and the minimum value for a locality (e.g., the locality 716 of the image block 702 of FIG. 7) is Y, then the process 600 can encode max(0, X−Y) for a minimum clamping value.

In another example, the clamping value can be encoded using entropy coding. As such, fewer bits can be used to code the clamping value. Entropy coding is a technique for "lossless" coding that relies upon probability models of priors. By using probability models (i.e., probability distributions) based on a measured or estimated distribution of values, entropy coding can reduce the number of bits required to represent data (e.g., image or video data) close to a theoretical minimum. The efficiency of entropy coding can be directly related to the probability model. A "model," as used herein, can be, or can be a parameter in, a lossless (entropy) coding. A model can be any parameter or method that affects probability estimation for entropy coding.

In an example, the priors can be the probability that an optimum (i.e., maximum, minimum) inverse-transformed value is (or is not) the optimum (i.e., maximum, minimum) value of the source image itself. For example, the distribution of pixel values in a decoded locality can be obtained. "Decoded locality" can refer to a locality in an inverse-transformed block. For example, an inverse-transformed block is a block that results from the operation of the inverse transform unit 460 of FIG. 4. In another example, the "decoded locality" can be a locality in a reconstructed block, such as a reconstructed block that results from the operation of the reconstruction unit 470. In yet another example, the "decoded locality" can be a locality in a filtered block, such as one that results from the operation of the filtering unit 480 but before clamping is applied.

The distribution of the pixel values and quantization information (e.g., the quantized values) can be used to determine the probability that the locality would include ringing after inverse transforming the quantized values. The probability of ringing can be used as a prior or context to entropy code the clamping value.

In an example, encoding 610 the clamping value in the compressed bitstream includes determining a probability distribution based on a prediction of ringing artifacts resulting from inverse transforming the transform block and entropy-coding the clamping value using the probability distribution. The prediction can be determined based on a variance and the quantized transform coefficients. The variance of decoded pixel values can be compared to the quantization levels. For example, the differences (e.g., sum of square differences) between pixel values in a locality and the average pixel value of the locality, or, similarly, the differences between neighboring pixels can be determined. The differences (i.e., variance) and the number of non-zero transform coefficients can be used to determine the probability distribution. The number of non-zero transform coefficients is indicative of the amount of "energy" in the locality. The higher the energy, the higher the probability of ringing. In another example, the difference between the highest decoded value and the lowest decoded value can be determined. The amount of ringing is proportional to the difference. That is, the higher the difference, the higher the probability of ringing in the locality.

In another example, the clamping value can be entropy-encoded using a probability distribution that is based on a prior (i.e., a prior probability distribution) as a function of at least one of a DC value, a darkest pixel, and a brightest pixel in the block. Correspondingly, a decoder can entropy-decode the clamping value using an equivalent probability distribution as that used by the encoder. The DC value corresponds the lowest frequency component of a transform block. The brightest pixel corresponds, for example, to the highest luminance value (or a highest chrominance value) of a locality. The darkest pixel corresponds, for example, to the lowest luminance value (or a lowest chrominance value) of the locality.

The probability distribution of the maximum (minimum) clamping value can be related to the actual observed maximum (minimum) value. An "observed value" refers to the pixel values of inverse transform block. As mentioned, the purpose of clamping is to decrease (increase) the observed maximum (minimum). Accordingly, the probability distribution of coding the maximum (minimum) clamping value is such that the probability distribution attempts to lower (increase) the observed maximum (minimum). The probability distribution is more likely to decrease (increase) the observed maximum (minimum) when the quantization level is relatively high. This is so because higher quantization levels increase the probability of ringing. Additionally, as mentioned above, the more variance exists in the block, the more likely that the true (i.e., in the source image) maximum (minimum) in the block is lower (higher) than the observed value.

It can be observed, heuristically, that the maximum (minimum) value of the inverse transformed block is roughly related to, and does not exceed (is less than), a multiple of the quantization step. For example, the maximum error that can be achieved due to quantization may be related to three to four times the quantization step. As such, the probability distribution for entropy-encoding the clamping value can become zero after a multiple of the quantization step. As such, any additional bits, which communicate (i.e., indicate) the use of a probability of zero would correspond to indicating that the maximum in the block (i.e., the inverse transformed block) is not to be clamped because (e.g., heuristically) it is the true maximum, and not a maximum that is due to ringing. As such, the additional bits for encoding the clamping value are bits to indicate a "do nothing" operation. That is, the additional bits indicate to a decoder that no clamping is to be applied. Such indication requires a minimal number of bits. On the other hand, when clamping is to be applied, up to 2 bits can be used to indicate the number of quantization steps (i.e., an adjustment quantization step) by which the maximum (minimum) is to be adjusted in the pixel domain.

In an example, encoding 610 the clamping value in the compressed bitstream can mean, or can include, encoding an adjustment quantization step. That is, instead of encoding a pixel-domain clamping value, an adjustment quantization step that is used in the frequency domain is encoded. For example, a decoder can use the adjustment quantization step to adjust (e.g., multiply by) the DC value of a decoded transform block prior to inverse transforming the block.

In an implementation, encoding the quantized transform coefficients in a compressed bitstream can include adjusting the DC value of the quantized transform coefficients using the adjustment quantization step prior to encoding the quantized transform coefficients. In this situation, the warping (i.e., adjusting) of the DC value by the adjustment quantization step negates the effect of ringing. Accordingly, the process 600 can omit encoding 610 the clamping value in the compressed bitstream. That is encoding 610 the clamping value in the compressed bitstream amounts to a no-op (i.e., no operation).

The process 600 can be understood to model different fields of the block and, by extension, to model different fields of the image (since the image is a collection of blocks). For example, in a case where the process 600 implements a dilation operation, the process 600 corresponds to modeling two different fields, namely, 1) a field corresponding to the maximum brightness in localities of the image, and 2) the image itself. The field corresponding to the maximum brightness is, by definition, a slow-changing field in a locality. Additionally, the larger the locality, the slower the change in the locality. In a case where the process 600 implements an erosion operation, the process 600 corresponds to modeling a third field, namely, 3) the minimum brightness in the locality, which is also a slow-changing field. That is, the process 600 can be understood to model the clamping values (i.e., a maximum clamping value, a minimum clamping value, or both) as low resolution or low information density fields.

By determining a maximum value for a locality (for example, by using a dilation operation), it can be concluded that no value of the collocated locality in a reconstructed block, such as the reconstructed block 714 of FIG. 7, can be larger than the maximum value. Accordingly, pixel values of the collocated locality of the reconstructed block that are greater than the maximum value can be clamped (i.e., reduced in value) to the maximum value.

By determining a minimum value for a locality (for example, by using an erosion operation), it can be concluded that no value of the collocated locality in a reconstructed block, such as the reconstructed block 714 of FIG. 7, can be smaller than the minimum value. Accordingly, pixel values of the collocated locality of the reconstructed block that are less than the minimum value can be clamped (i.e., increased in value) to the minimum value.

As described above, the ringing artifacts (due, at least partially, to quantization) result in overshoots (i.e., new maxima) and/or undershoots (i.e., new minima) in the reconstructed image. The above determined maximum values and minimum values can be used to negate, at least partially, the ringing-related maxima and/or minima.

FIG. 9 illustrates an example 900 of modeling maximum brightness in localities of an image according to implementations of this disclosure. As mentioned above, FIG. 9 includes the image 910, which includes a sky background and branches occluding the background. An image 920 (also referred to herein as "a mask image" or "dilated image") illustrates a low-information content mask image that is computed using a morphological dilation as described herein and to which a Gaussian blurring filter is also applied. As can be seen, many of the high frequency components of the image 910 are removed in the image 920. The image 920 mainly includes low frequency components and smooth areas. For example, the branches occluding the sky and the background building are removed in the image 920. As such, the image 920 can be encoded with significantly fewer bits than the image 910.

In an implementation, the determined clamping values for all the blocks of an image can be encoded collectively as an image. For example, the image 920 can be encoded in the compressed bitstream as described with respect to FIG. 4. As such, ringing can be removed by taking the minimum intensity values between a decoded image and the mask image. That is, in this example, instead of performing an erosion operation to determine minimum clamping values, the minimum values of the maximum field (i.e., the mask image) can be used as the minimum clamping values.

As such, in an implementation according to this disclosure, a quantization step (i.e., quantization level) selected by an encoder can be further increased, thereby increasing compression of the image. The quantization step is a variable used for scaling the quantized coefficients in the coding process. For example, before entropy encoding the quantized coefficients, the coefficients are divided by the quantization step; and a decoder multiplies the dequantized coefficients by the quantization parameter before inverse transforming them. The increase in the quantization parameter may result in loss of quality. However, the loss of quality can be compensated for (i.e., at least partially negated) by the clamping operation.

As mentioned above, the mask image can be encoded in the compressed bitstream. However, to avoid ringing artifacts in the compression of the image 920, at least one of the transform unit 420 and the quantization unit 430 can be bypassed. Accordingly, as the mask image is a slowly-changing image, it can be entropy-coded (i.e., encoded by an encoder, or decoded by a decoder) using priors (i.e., a prior probability distribution). The priors can be, or can be based on, decoded values. That is, for example, the decoded values can be the inverse-transformed values (i.e., resulting from the operation of an inverse transform unit, such as the inverse transform unit 460 of FIG. 4 or the inverse transform unit 530 of FIG. 5). The maximum observable value in a decoded block can be used as a prior for the maximum clamping value. Similarly, when erosion is used, the minimum observable value in a decoded block can be used as a prior for the minimum clamping value.

Figure 10:
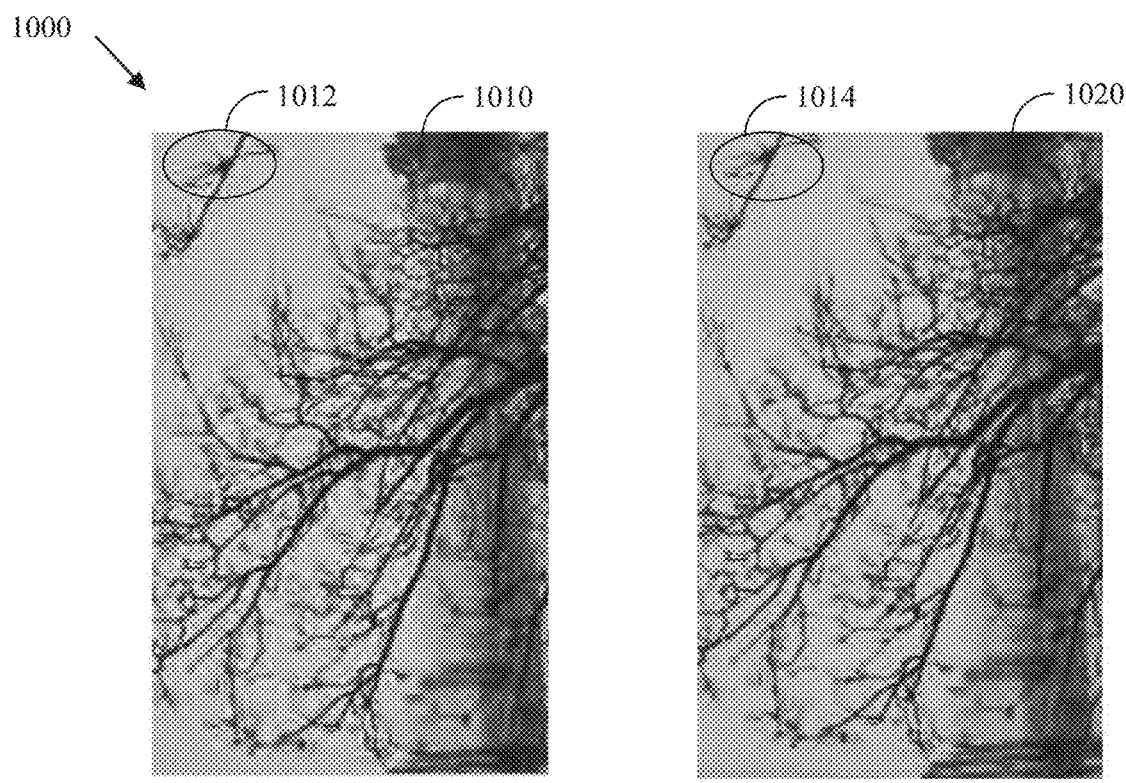
FIG. 10 is an example illustrating reducing ringing artifacts according to implementations of this disclosure.

FIG. 10 is an example 1000 illustrating reducing ringing artifacts according to implementations of this disclosure. The example 1000 includes a decoded image 1010 and a filtered image 1020. The decoded image 1010 can be a decoded image resulting from the operation of the reconstruction unit 470 of FIG. 4 (or, equivalently, the reconstruction unit 550 of FIG. 5) or the filtering unit 480 of FIG. 4 (or, equivalently, the filtering unit 560 of FIG. 5). Clamping, as disclosed herein, is not applied to the decoded image 1010. On the other hand, clamping is applied to the filtered image 1020. An area 1014 of the filtered image 1020 corresponds to an area 1012 of the decoded image 1010. Ringing is observable in both the brighter and darker directions of the base level of the area 1012. On the other hand, ringing toward the brighter direction has been cut off in the area 1014.

Figure 11:
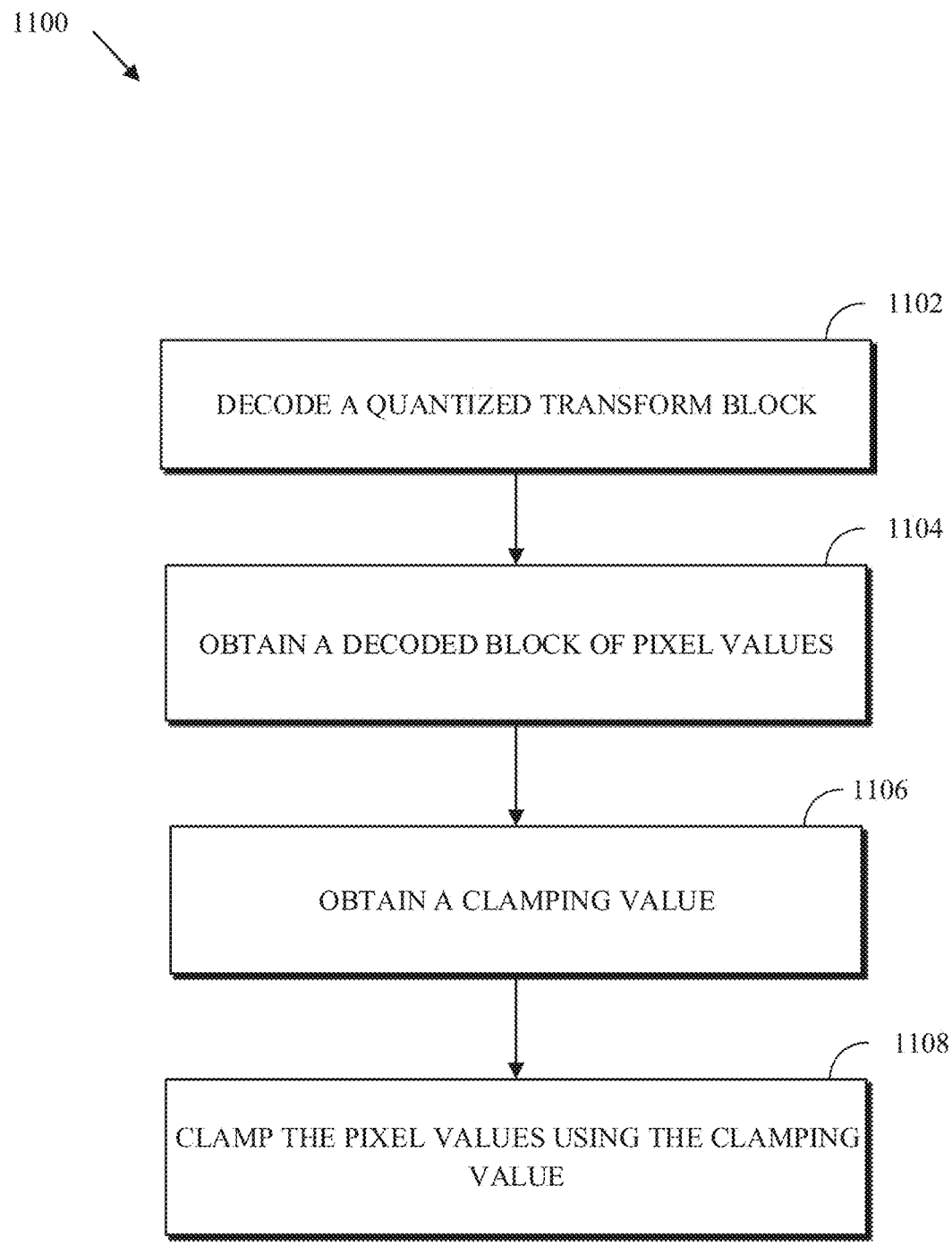
FIG. 11 is an example of a process for decoding a block of an image according to an implementation of this disclosure.

FIG. 11 is an example of a process 1100 for decoding a block of an image according to an implementation of this disclosure. The image can be a single image or a frame of a video sequence, such as the frame 330 of FIG. 3. The block can be one of the blocks 340. The block includes pixel values. That is, the block includes pixels, and each pixel has a corresponding pixel value. The pixel value can be a luminance value Y, a chrominance U value, a chrominance V value, or other color component value. The process 1100 inverse transforms a transform block that is decoded from a compressed bitstream, obtains a reconstructed block from the inverse-transformed block, and decodes a clamping value from the compressed bitstream. The process 1100 clamps the pixel value of the reconstructed block using the clamping value. The clamping value can be as described above.

The process 1100 can be implemented, for example, as a software program that may be executed by computing devices, such as the computing and communication devices 100A, 100B, 100C. The software program can include machine-readable instructions that may be stored in a memory, such as the memory 110, and that, when executed by a processor, such as the CPU 120, can cause the computing device to perform the process 1100. Operations of the process 1100 can be implemented in whole or in part by the entropy decoding unit 510, the dequantization unit 520, the inverse transform unit 530, the reconstruction unit 550, the filtering unit 560, other units, or any combination thereof, of the decoder 500 of FIG. 5. The process 1100 can be implemented using specialized hardware or firmware. Multiple processors, memories, or both, may be used.

At 1102, the process 1100 decodes, from a compressed bitstream, a quantized transform block. The quantized transform block can be decoded as described with respect to the entropy decoding unit 510 of FIG. 5.

At 1104, the process 1100 uses the quantized transform block to generate a decoded block of pixel values. In an example, the pixel values are luminance values. In another example, the pixel values are chrominance values. In an example, the decoded block can be a block that results from the operation of the reconstruction unit 550. In an example, the decoded block can be a block that results from the operation of the filtering unit 560.

At 1106, the process 1100 obtains a clamping value for the block. In an example, the process 1100 obtains the clamping value by decoding the clamping value from a compressed bitstream. The process 1100 can decode the clamping value using a technique that is parallel to the technique used by an encoder, such as described with respect to FIG. 6, to encode the clamping value in the bitstream. In an example, the process 1100 uses the pixel values of the decoded block and the quantized coefficients of the quantized transform block to determine a probability distribution for decoding the clamping value.

At 1108, the process 1100 clamps the pixel values of the decoded block using the clamping value. As described with respect to FIG. 6, the clamping value can be a maximum value that is used to upper-bound pixel values of a locality of the decoded block, and/or the clamping value can be a minimum value that is used to lower-bound pixel values of a locality of the decoded block. The clamping value can include both a maximum value and a minimum value. As such, decoding 1106 the clamping value for the block includes decoding a maximum value from the encoded bitstream and decoding a minimum value from the encoded bitstream.

In an example, clamping 1108 the pixel values using the clamping value includes, on a condition that a first pixel value of a first pixel of the block is greater than the maximum value, setting the first pixel value to the maximum value; and on a condition that a second pixel value of a second pixel of the block is less than the minimum value, setting the second pixel value to the minimum value. The first pixel is a pixel that corresponds to the quantized transform block. That is, the first pixel results from inverse transforming the quantized transform block. Similarly, the second pixel is a pixel that corresponds to the quantized transform block.

In an example, the process 100 obtains 1106 the clamping value by decoding two or more clamping values from the compressed bitstream. Each of the decoded clamping value can correspond to a transform block; and clamps 1108 the pixel values using a clamping value that is an interpolation of the two or more clamping values. In an example, the interpolation can be the average of the two or more clamping values.

For simplicity of explanation, the processes 600 and 1100 are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms, and/or instructions described herein. In addition or alternatively, for example, a special-purpose computer/processor, which can contain specialized hardware for carrying out any of the methods, algorithms, or instructions described herein, can be utilized.

The transmitting computing and communication device 100A and the receiving computing and communication device 100B can, for example, be implemented on computers in a real-time video system. Alternatively, the transmitting computing and communication device 100A can be implemented on a server, and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method for reducing artefacts in encoding a block of an image, the block comprising first values, the method comprising:
   generating a transform block for the block of the first values;
   generating quantized transform coefficients for the transform block;
   determining, using the first values of the block, a clamping value for the block, the clamping value used to clamp second values of a reconstructed block corresponding to the block of the first values,
      wherein the clamping value is a pixel-domain value,
      wherein the clamping value is determined by applying a morphological operation to the block to obtain a resultant block, and
      wherein the clamping value is at least one of a maximum value of the resultant block or a minimum value of the resultant block;
   encoding the quantized transform coefficients in a compressed bitstream; and
   encoding the clamping value in the compressed bitstream.

2. The method of claim 1, wherein clamping value is the maximum value of the resultant block.

3. The method of claim 2, wherein the morphological operation is a dilation operation that is applied to the image.

4. The method of claim 2, wherein the morphological operation is a dilation operation that is applied to a locality of the block that is coextensive with the transform block.

5. The method of claim 1, wherein the morphological operation is an erosion morphological operation, and
   wherein the clamping value is the minimum value of the resultant block.

6. An apparatus for encoding blocks of an image, the blocks comprising a block of first values, the apparatus comprising:
   a memory; and
   a processor, wherein the processor is configured to execute instructions stored in the memory to:
      generate a transform block for the block of the first values;
      generate quantized transform coefficients for the transform block;
      determine, using the first values of the block, a clamping value for the block, the clamping value used to clamp second values of a reconstructed block corresponding to the block of the first values,
         wherein the clamping value is a pixel-domain value,
         wherein the clamping value is determined by applying a morphological operation to the block to obtain a resultant block, and
         wherein the clamping value is at least one of a maximum value or a minimum value of the resultant block;
      encode the clamping value in a compressed bitstream; and
      encode the quantized transform coefficients in the compressed bitstream.

7. The apparatus of claim 6, wherein the clamping value is the maximum value of the resultant block.

8. The apparatus of claim 7, wherein the morphological operation is a dilation operation that is applied to the image.

9. The apparatus of claim 6, wherein the morphological operation is an erosion morphological operation, and wherein the clamping value is the minimum value of the resultant block.

10. An apparatus for decoding a block of an image, comprising:
    a memory; and
    a processor, wherein the processor is configured to execute instructions stored in the memory to:
       decode, from a compressed bitstream, a quantized transform block;
       obtain, using the quantized transform block, a decoded block of pixel values;
       decode, from the compressed bitstream, a clamping value for the block, wherein an encoder encoded the clamping value by instructions to:
          apply a morphological operation to a source block of the decoded block to obtain a resultant block, and
          encode at least one of a maximum pixel value of a minimum pixel value of the resultant block as the clamping value; and
       clamp the pixel values of the decoded block to the clamping value.

11. The apparatus of claim 10, wherein the pixel values are luminance values.

12. The apparatus of claim 10, wherein to clamp the pixel values using the clamping value comprises to:
    on a condition that a first pixel value of a first pixel of the block is greater than the maximum pixel value, set the first pixel value to the maximum pixel value; and
    on a condition that a second pixel value of a second pixel of the block is less than the minimum pixel value, set the second pixel value to the minimum pixel value.

13. The method of claim 1, wherein encoding the clamping value in the compressed bitstream comprises:
    determining a probability distribution based on a prediction of ringing artifacts resulting from inverse transforming the transform block, wherein the prediction is determined based on a variance and the quantized transform coefficients; and
    entropy-coding the clamping value using the probability distribution.

14. The method of claim 1, wherein encoding the clamping value in the compressed bitstream comprises:

entropy-encoding the clamping value using a probability distribution that is based on a prior as a function of at least one of a DC value, a darkest pixel, and a brightest pixel in the block.

15. The apparatus of claim 6, wherein to encode the clamping value in the compressed bitstream comprises to:
    differentially encode the clamping value.

16. The apparatus of claim 6, wherein to encode the clamping value in the compressed bitstream comprises to:
    determine a probability distribution based on a prediction of ringing artifacts resulting from inverse transforming the transform block, wherein the prediction is determined based on a variance and the quantized transform coefficients; and
    entropy-code the clamping value using the probability distribution.

* * * * *

UNITED STATES PATENT AND TRADEMARK OFFICE
CERTIFICATE OF CORRECTION

PATENT NO. : 10,645,418 B2
APPLICATION NO. : 15/952287
DATED : May 5, 2020
INVENTOR(S) : Jyrki Alakuijala and Zoltan Szabadka Page 1 of 1

It is certified that error appears in the above-identified patent and that said Letters Patent is hereby corrected as shown below:

Column 3, Line 61, change "$0 < x- < M - 1 , 0 < y < N - 1$" to --$0 \leq x \leq (M-1), 0 \leq y \leq (N-1)$--

Column 4, Line 6, change "$0 < x- < M - 1 , 0 < y < N - 1$" to --$0 \leq x \leq (M-1), 0 \leq y \leq (N-1)$--

Signed and Sealed this
Seventeenth Day of November, 2020

Andrei Iancu
*Director of the United States Patent and Trademark Office*